(12) United States Patent
Wettlaufer

(10) Patent No.: US 6,479,092 B1
(45) Date of Patent: Nov. 12, 2002

(54) METHOD AND APPARATUS FOR INFUSING FRUIT WITH SUGAR AND FOR OBTAINING A SUBSTANTIAL JUICE BYPRODUCT

(76) Inventor: Dale E. Wettlaufer, 206 Kelly Dr., East Aurora, NY (US) 14052

( * ) Notice: Subject to any disclaimer, the term of this patent is extended or adjusted under 35 U.S.C. 154(b) by 0 days.

(21) Appl. No.: 09/669,311

(22) Filed: Sep. 25, 2000

Related U.S. Application Data

(63) Continuation-in-part of application No. 09/230,024, filed as application No. PCT/US97/12508 on Jul. 18, 1997, now Pat. No. 6,159,527.
(60) Provisional application No. 60/022,190, filed on Jul. 19, 1996, and provisional application No. 60/032,490, filed on Dec. 18, 1996.

(51) Int. Cl.[7] ............................................. A23L 2/212
(52) U.S. Cl. ...................... 426/639; 426/102; 426/103; 426/310; 426/615; 426/640
(58) Field of Search ................................ 426/639, 640, 426/615, 310, 102, 103

(56) References Cited

U.S. PATENT DOCUMENTS

| | | | |
|---|---|---|---|
| 1,534,050 A | 4/1925 | Barrielle | |
| 1,717,258 A | 6/1929 | Rambaud | |
| 1,906,295 A | 5/1933 | Wickenden | |
| 2,785,071 A | 3/1957 | Mathews | |
| 3,032,419 A | 5/1962 | Limpert | |
| 4,350,711 A | 9/1982 | Kahn et al. | |
| 4,626,434 A | 12/1986 | O'Mahony et al. | |
| 4,713,252 A | 12/1987 | Ishmail | |
| 4,892,665 A | 1/1990 | Wettlaufer | |
| 5,275,097 A | 1/1994 | Wettlaufer | |
| 5,320,861 A | 6/1994 | Mantius et al. | |

FOREIGN PATENT DOCUMENTS

| | | | | |
|---|---|---|---|---|
| DE | 3316637 | * | 8/1984 | ................. 426/639 |
| JP | 0078536 | * | 5/1985 | ................. 426/639 |

OTHER PUBLICATIONS

Nickerson, J. T. and Sinskey, A. J., Microbiology of Foods and Food Processing 1972, pp. 71–83, American Elsevier Publishing Company, New York, NY.

* cited by examiner

Primary Examiner—Helen Pratt
(74) Attorney, Agent, or Firm—John C. Thompson

(57) ABSTRACT

Method and apparatus for infusing fruits (which may include vegetables) with sugar. The apparatus includes a series of interconnected tanks (10, 12, 14, and 16). A stratified column of infusing liquor is caused to flow from a tank (50) via variable output pump (52) through fruit which is placed within the tanks to cause the fruit to become saturated with sugar. In addition, at start-up, frozen fruit is placed in a warming liquid in the tanks prior to infusing, and the infusing liquor will drive the warming liquid in front of it. Fruit juice is removed from the downstream portion of the infusing liquid.

5 Claims, 3 Drawing Sheets

METHOD AND APPARATUS FOR INFUSING FRUIT WITH SUGAR AND FOR OBTAINING A SUBSTANTIAL JUICE BYPRODUCT

CROSS-REFERENCE TO RELATED APPLICATIONS

This application is a continuation-in-part of applicant's U.S. patent application Ser. No. 09/230,024 filed Jan. 15, 1999, issued on Dec. 12, 2000 as U.S. Pat. No. 6,159,527 which application is a 35 USC 371 of PCT/US97/12,508 filed Jul. 18, 1997 which in turn claims priority from applicant's provisional applications 60/022,190 filed Jul. 19, 1996 and 60/032,490 filed Dec. 18, 1996.

TECHNICAL FIELD

The present invention relates generally to a method and apparatus for infusing fruit, and more particularly to such a method and apparatus wherein there is a substantial juice byproduct and the fruit does not appear to have been dehydrated during processing, the fruit having the characteristics of juiciness and sweetness.

BACKGROUND OF THE INVENTION

U.S. Pat. No. 4,626,434, assigned to Rich Products, relates to a single step process for infusing fruit. In this process the fruit is placed into a 70% fructose syrup bath maintained at a temperature of approximately 65–71° C. (150–160° F.). (It is possible to use sucrose, which is a disaccharide consisting of fructose and glucose chemically bonded together. During processing the sucrose will be "inverted", i.e., the bond will be shattered and the sucrose will end up as fructose and glucose.) In the sugar syrup bath a portion of the fruit juice (water and aromatics) within the fruit will pass through the outer membranes of the fruit osmotically, and as the water tends to dilute the sugar syrup, the sugar syrup will be maintained at or near its initial sugar percentage by introducing concentrated sugar syrups. During this time equal amounts of diluted syrup are withdrawn and subsequently treated, the final byproduct being a sugar syrup which is reintroduced into the bath. The disadvantage of the Rich Products process is that the water goes out of the fruit faster than the sugar goes in, causing osmotic dehydration of the fruit. Once the fruit is osmotically dehydrated, it cannot be "plumped up," i.e., re-infused with a plumping liquid so that it does not appear to be dehydrated. In addition, there are no juice by-products. The juice is irretrievably mixed with the syrup.

U.S. Pat. No. 5,320,861, assigned to Ocean Spray, discloses a two step process for infusing fruit. In the first step a decharacterized fruit product is produced by a countercurrent "leaching" process. In the countercurrent process up to 94% of the fruit juice content is extracted and is replaced by water. This process does not cause osmotic dehydration as the osmotic transfer rates of the water and fruit juices are substantially the same. The decharacterized fruit is substantially nothing more than cellulose and water. The byproduct of this process is 3% fruit juice, which can be changed by evaporation to full strength. The second step of the process also uses a countercurrent process, the apparatus being substantially identical to that used in the first step of the process. During the second step an aqueous blend (or liquor) of sucrose and cranberry fruit juice components (or other equivalent fruit components) is used to infuse the decharacterized fruit. In addition, fruit flavorings and food colorings must be added to the infusing liquor used in the second step of the process in order to make the infused fruit resemble a cranberry. The result is a new fruit product in the way of infused cranberry having the sweetened flavor of the infusing liquor and cranberry juice. The resultant fruit product is dried and optimally has a sugar to water by weight ratio of about 70%. This sugar to water weight ratio is commonly referred to as Brix in the industry, and this term will be used in the remained of this specification. The disadvantage of this process is that the augers used by the countercurrent process is rough on soft or fragile fruit, causing too many undesirable fines. In addition, as water is extracted from the cranberries during the second step, the water will dilute the infusing liquor, and the augers cause mixing of dilute infusing liquor with the initial concentrated infusing liquor.

U.S. Pat. No. 2,785,071 to Mathews teaches infusing previously extracted fruit by moving a sugar front through the previously extracted fruit, the front having a sugar content beginning at zero and increasing in sugar content as the front is passed by the layers of fruit. In order to properly infuse the fruit according to the Mathews patent, a pretreatment process must be followed to prepare the fruit for infusing. The fruit must be soaked in a solution bath of ¼ to 1% of sulfur dioxide brine. The brine acts as a preservative for the fruit. Next, the fruit is boiled in order to volatilize the sulfur dioxide from the fruit.

Boiling also cooks the fruit, tenderizes the fruit, and loosens the fibrous material. The fruit is next washed, diced, and washed again. The fruit now needs to be dyed in order to have any color. The infusion portion of the process disclosed in Mathews is a sequential batch process and is illustrated best in FIG. 1 of the Mathews patent. In the infusion process tanks 6, 7, & 8 are filled with the fruit to be processed, and a front of sugar heated to 49–60° C. (120–140° F.) is initially introduced into the base of tank 6, the sugar initially having a high sugar content.

As the front of sugar syrup moves up though tank 6, it will be diluted by the water in the fruit cells of the fruit within the tank in a manner similar to that disclosed in the Rich patent. As the sugar front initially passes through conduit 21 it will have only a slightly higher sugar percentage than that of the fruit through which it has passed. (The initial tank will have fruit which suffers from osmotic dehydration.) As the front of sugar moves up through tank 7 the succeeding fronts of sugar increase in Brix content, and the fruit product will be sweetened. The Mathews patent sweetens the fruit to 77 Brix. A disadvantage of the process is in the pretreatment necessary to prepare it for impregnation with syrup. Thus the fruit is boiled and washed several times, which ruins the flavor of the fruit. In addition, the high temperatures recommended for both pretreatment and infusing turn the fruit mushy and will discolor some fruits, such as cranberries and strawberries. Furthermore, since virtually all the juice of the fruit is washed out during pretreatment, there is no possibility of extracting fruit juice. In addition, this process is not feasible for soft, previously frozen fruit.

U.S. Pat. No. 1,534,050 to Barrielle suggests a method in which fruit contained in a "plurality of vats" (in his example he proposes 20 vats) is brought systematically in contact with a sugar syrup, starting with the most infused vat, proceeding finally to the least infused vat. The weakened syrup is then restored via evaporation and sugar addition to its original strength. It can then be used again. The syrup it said to follow a "continuous and uninterrupted cycle". The syrup is admitted either from the top or bottom of each vat, and the suggested temperature is 50° C. to 75° C. In the Barrielle patent no mention is given as to what is to be done with fruit juice that diffuses out of the fruit during infusion of sugar. He mentions only that "the fruits that are in contact with solutions of gradually increasing richness in sugar give off their water by osmosis". This would be true if the fruit initially contained only pure water,(i.e. If the juice were previously removed). Perhaps he assumed this would be true. Unfortunately most fruit contains fruit juice, which contains flavor elements, color elements, tannins (bitter elements), natural pectin, odors, and hundreds of other chemical compounds. Many of these natural constituents of fruit juice remain behind during evaporation, thus constantly increasing in strength with each pass through the system. This quickly spoils the syrup which gets very dark and bitter and which turns to a gel due to the presence of pectin. It then must be discarded or sold as a low price item. (It is this very problem that Mantius avoids by washing almost all the juice out with water prior to infusion.)

U.S. Pat. No. 4,232,419 to Limpert teaches that the fruit is pre-treated by sulphur dioxide brine, and several washings with water prior to infusion. No juice extraction is possible.

U.S. Pat. No. 1,717,258 to Rambaud teaches a process of enriching fruit with sugar. There is no mention of juice extraction. The concentrated sugar syrup is introduced from the top of each vessel, and the diluted sugar syrup is also withdrawn from the top of each vessel. This would cause undesirable mixing of the front. No mention is made of how he plans on handling ever increasing volumes of infusion syrup.

OBJECTS AND SUMMARY OF THE INVENTION

It is an object of the present invention to provide a method and apparatus which overcomes the disadvantages of prior processes.

More particularly, it is an object of the present invention to provide a method and apparatus for infusing fruit which will produce an infused fruit having the characteristics of juiciness and sweetness.

A further object of the present invention is to extract juice and infuse sugar into a fruit in one step, while still producing a substantially pure juice product.

It is a further object of the present invention to process fruit to be infused with sugar at temperatures which do not exceed 38° C. (100° F.), and which preferably may be carried out at temperatures at or below room temperature. By using temperatures which don't exceed 38° C. quick fermentation of the diluted fruit front is avoided.

It is a further object of the present invention to infuse fruit gently with no stirring or agitation, so that soft, fragile and/or previously frozen fruit may be processed.

A still further object of the present invention is to reduce the need for use of evaporators to recycle and reuse infusing liquor.

It is yet a further object of the present invention to infuse fruit without using preservatives and without losing much of the natural aromatics contained within raw fruit.

Another object of the present invention is to provide a method and apparatus for infusing fruits which may be practiced with just one vat or with many vats.

These and other objects and advantages of this invention will be apparent to one having ordinary skill in the art after a consideration of the following detailed description taken in conjunction with the accompanying drawings.

DETAILED DESCRIPTION IN GENERAL

In this invention, fruit is infused with sugar by flowing an infusing liquor containing dissolved sugar and fruit juice through the processed fruit. The infusing liquor has strata of progressively higher concentrations of sugar. The flow rate is controlled so that the strata with the progressively higher concentrations of sugar only just slightly exceeds the sugar content of the fruit being infused. Thus, the infusing is done at a rate slow enough so that as fruit juice leaves the fruit it will be replaced with sugar during an osmotic transfer without causing osmotic dehydration. This slight differential in sugar contents is necessary in order to prevent osmotic dehydration. This infusion continues until the fruit reaches saturation. At saturation, the liquid inside the fruit gels, firming the fruit so that the infused fruit has a firmness similar to the firmness of the raw fruit.

Before infusion, fruits may be initially processed to condition it for infusion. The initial processing of hard fruits, such as cranberries, may include pressing it, to remove a desired quantity of juice, typically about 50–80% of the fruit juice. (The amount of juice removed may be that necessary to leave a soluble acid concentration substantially equal to that desired in the fully infused fruit.) In addition, care is exercised during pressing so that most of the cells within the fruit are not ruptured. After the initial pressing of hard fruits, th e fruit is plumped up (or plumped) by replacing the juice which has been pressed out with other fluids by immersing the fruit in a mixture of water, juice and sugar. After this step has been completed, the fruit is then infused in the manner set forth above. The invention which includes pressing of a hard fruit is more fully set forth in applicant's U.S. Pat. No. 6,159,527.

Figure 1:
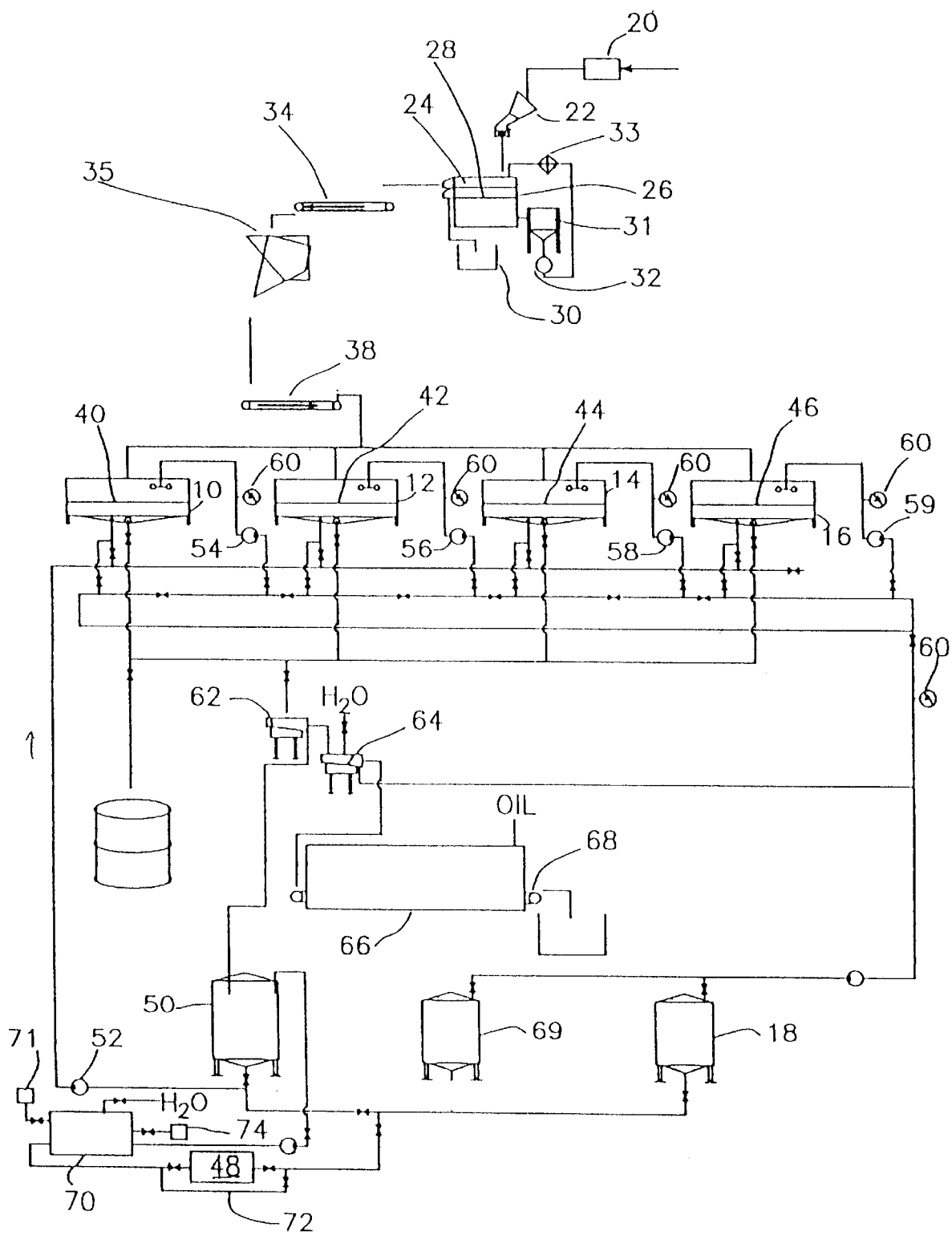
FIG. 1 is an overall all inclusive process flowchart for infusing fruit, such as strawberries, which is sliced prior to infusing.
Figure 2:
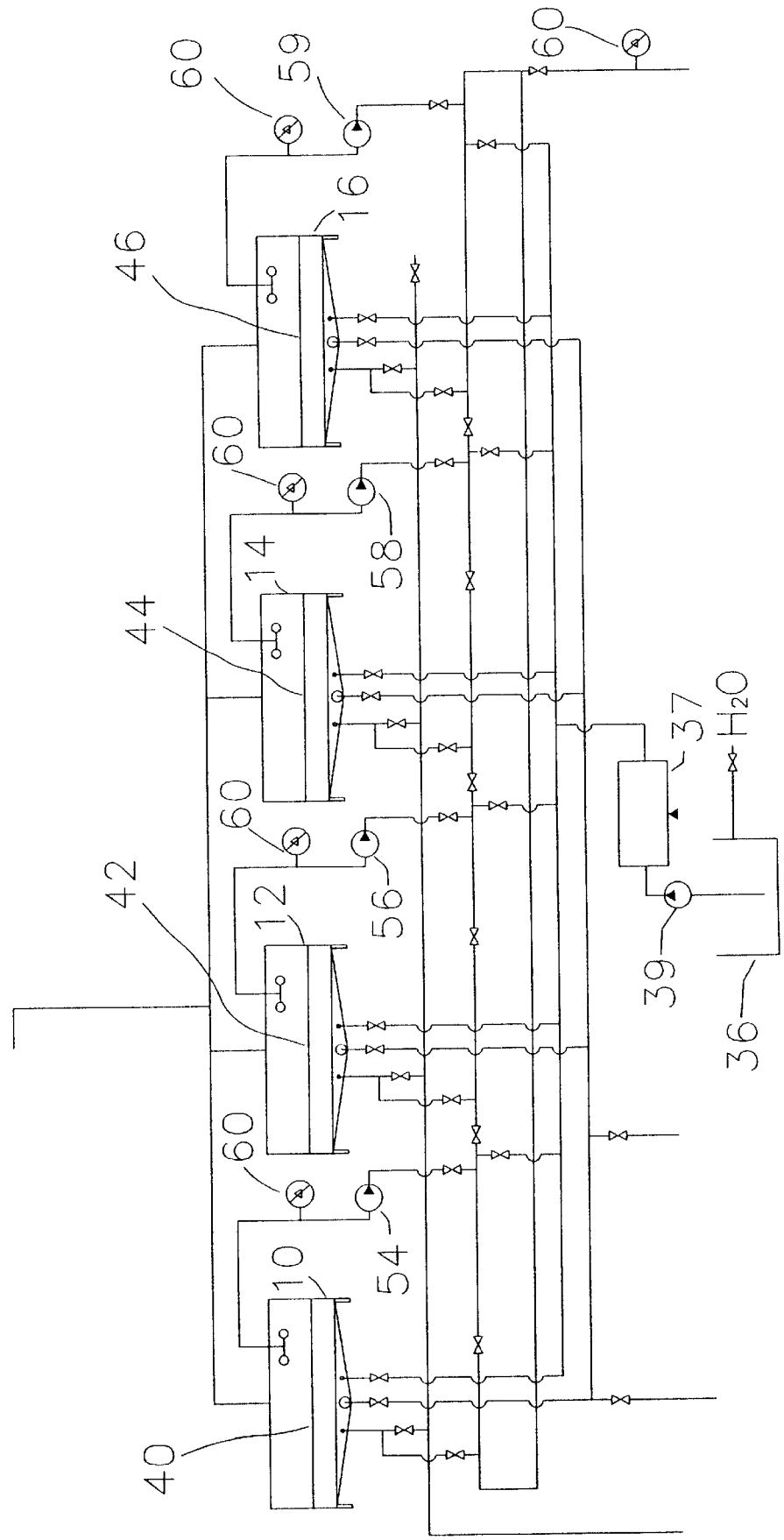
FIGS. 2–3 are enlarged details of portions of FIG. 1.

The operation of the process illustrated in FIG. 1 is a continuous batch process. As shown in FIGS. 1 and 2, four tanks or vats 10, 12, 14, and 16 are used for infusing fruit, these tanks being interconnected with suitable plumbing to establish a flow path from tank 10 to tank 12 to tank 14 to tank 16 and back to tank 10. In addition, a bleed or overflow tank 18 is also provided. While four tanks are illustrated, the invention may be practiced with a single vat, 2–3 vats, or with 5 or more vats. Fresh fruit (which may be at room temperature or frozen, and which may be processed or unprocessed fruit) is placed in the first tank in the series, and then fresh fruit is introduced sequentially in each subsequent tank in the series after suitable time intervals. Thus, at the beginning of a first time interval, fresh fruit is loaded into tank 10, at the beginning of a second time interval (which might be 3–12 hours later) fresh fruit is loaded into tank 12, and so on. Fresh fruit is always loaded into a tank just before it is processed to avoid premature spoilage of the fruit.

Start-up of Infusing

As the process may vary from fruit to fruit, the processing of a soft fruit such as strawberries will be described initially. At the start-up of infusing, and during a first time interval or cycle, a first batch of whole strawberries, which have been frozen in a conventional manner, are taken from a freezer and placed in thin layers in infusion vessel 10. If desired the strawberries may be sliced and diced after tempering and before infusion. This is discussed below under the heading INITIAL PROCESSING. Strawberries are infused best if the layers are not greater than 7.5 mm or 3 inches deep. For this discussion, it will be assumed that the sugar content of the strawberries is 12%, and therefore, the sugar to water weight ratio will be at or slightly below 12% (commonly referred to in the industry as Brix.) The first batch of frozen berries are thawed with warm water, for a few moments after the tank 10 has been filled. The warm water comes from tank 36, and may be pumped into the vat 10 through heater 37 by pump 39. Initially the heating liquid is warmed water, but after a while it becomes mixed with fruit juice. The thawing liquid is warmed to about 65–70° C. (150–160° F.). The fruit is covered with a screen 40 which may be secured to tank 10 in any conventional manner.

The screen secures the fruit within the tank and prevents it from floating downstream to the next tank with the flow of infusing liquor from one tank to the next.

The thawing time is determined by observing the tank 10. Initially, when warm water thawing liquid is introduced into the tank frost will form on the outside of the tank. When the tank is no longer frosty, the berries will have become sufficiently thawed to be infused. This thawing time period will be noted.

Figure 3:
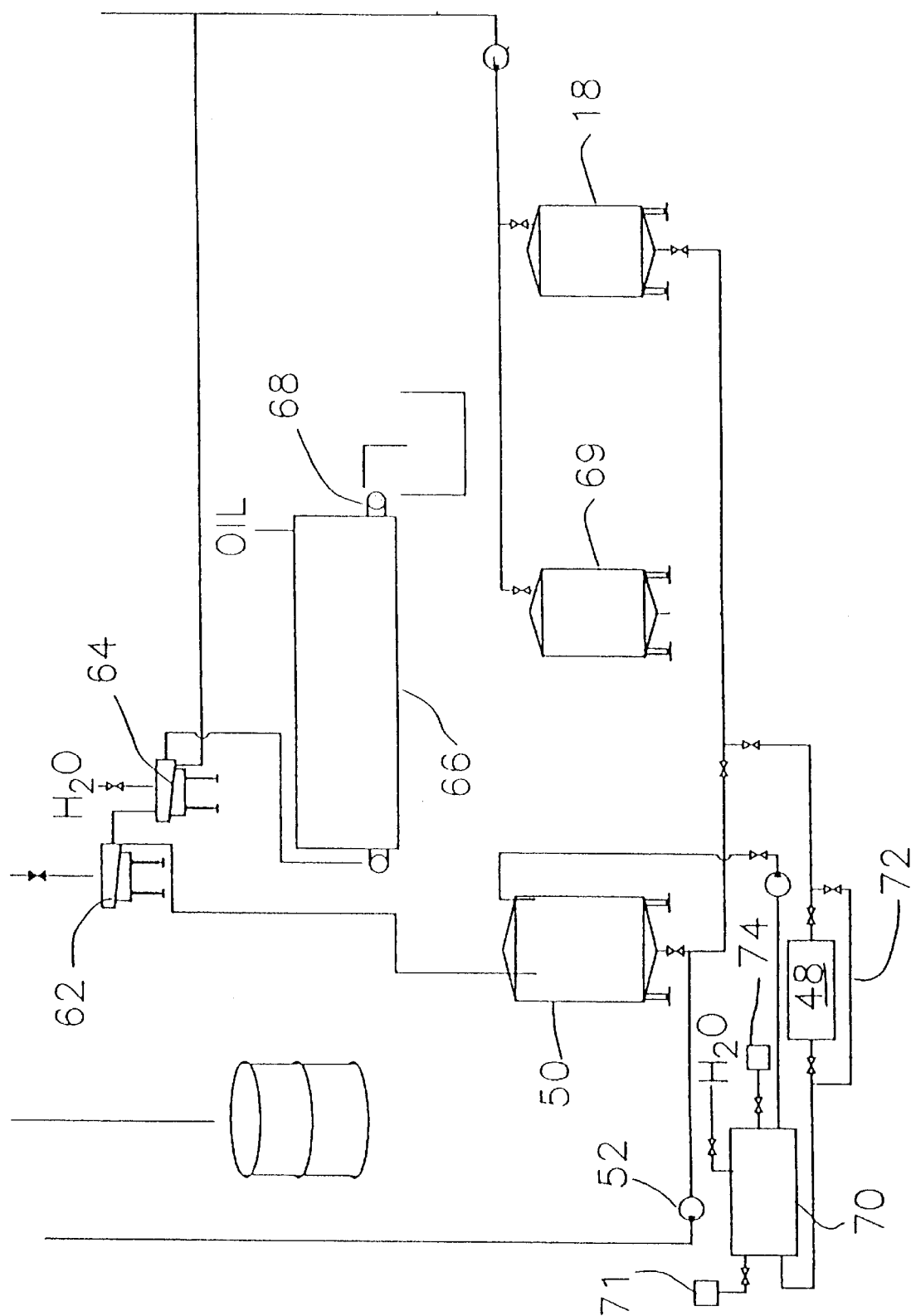

Next, during a second time interval an infusing liquor, which consists of a fruit juice or fruit juice concentrate which has been fortified with additional sugar if necessary to bring it to 70 Brix, is now slowly introduced into the bottom of tank 10 from tank 50 by pump 52 (FIG. 3) to progressively infuse the berries from the bottom up. When the infusing liquor is introduced into tank 10, suitable valves are opened to permit thawing liquid to flow from tank 10 to a holding tank 36. As the front of the 70 Brix infusing liquor moves slowly up through the berries in tank 10, stratification of the infusing liquor will occur. Thus, the initial strata of the 70 Brix infusing liquor will be diluted as fruit juice leaves the fruit through osmosis, until the leading downstream strata is essentially pure fruit juice with a Brix just slightly greater than that of the fruit, for example just above 12 Brix if the fruit has a Brix of 12. Infusing liquor which has had its Brix reduced to that of the fruit is now considered to be a juice product. Normally this full dilution of the infusing liquor will not occur in the first tank during the second time interval, but in the second tank during a third time interval. Succeeding strata of the infusing liquor (as measured in the upstream direction) will have progressively increasing Brix up to the initial Brix of the infusing liquor. Initially, the pump 52 controls the flow rate of infusion liquor into the vat 10. It may take as little as 3 hours or as long as 12 hours to fill the vat with infusion liquor, the time being established by the particular fruit and any initial processing it may have received. Thus, if osmosis is fairly rapid in a particular fruit, the tank may be filled more quickly, for example, in three hours. However, if osmosis is slow for a particular fruit, the tank may be filled more slowly, for example 12 hours. In any event, the next tank will be filled with a layer of berries and a thawing liquid a sufficient length of time before the first tank becomes completely filled, so that the berries in the second tank become thawed before the first tank becomes completely filled with infusion liquor.

During a third time interval or cycle, the 70 Brix infusing liquor is still introduced into tank 10, and suitable valves are opened to permit the front of the infusing liquor to move from tank 10 to tank 12, the flow being controlled by pumps 52 and 54. Meanwhile, suitable valves are opened to permit the thawing liquor in tank 14 to flow into holding tank 36. Before the end of this time interval new berries are introduced into tank 16 and held in place by screen 46 for a sufficient length of time to thaw the layer of berries. By the end of the third time interval, full, or substantially full, stratification of the infusing liquor has been achieved, and there will be no danger, or virtually no danger, of osmotic dehydration of the fruit in tanks 14 and 16, as the stratified column of infusing liquor is caused to flow into these tanks, although there may have been some osmotic dehydration in tank 12, and there was osmotic dehydration to the berries in tank 10 during start-up. The batch process will now be continuously operated in the manner set forth below under the heading CONTINUOUS BATCH PROCESSING.

In order to better understand the above, it is best to consider the theory of operation for creating a stratified infusion liquor. After thawing, a sugar and juice solution of 70 Brix is pushed through the berries in tank 10 slowly, allowing each level of berries to come to an equilibrium concentration with the solution through diffusion. This process eventually, perhaps in 1 ½–2½ cycles, causes a stratified column of infusion liquor to be formed, with a 70 Brix strata on the bottom or upstream end of the column and a 12 Brix strata on the top or downstream end of the stratified column as the liquor is pushed through each successive layer of strawberries. This phenomenon may be examined in detail by examining a layer of strawberries having a thickness of one strawberry through each pass of infusing liquor. Before thawing, the berries are at a Brix of approximately 12. The thawing liquid may be at a Brix of approximately 8 to 10. The berries will reach an equilibrium concentration according to the following formula:

$$B_3 = \frac{B_1 \times W_1 + B_2 \times W_2}{W_1 + W_2}$$

where $B_1$=Brix of the liquid surrounding the fruit, $W_1$=weight of the liquid surrounding the fruit, $B_2$=Brix of the liquid within the fruit, $W_2$=weight of the liquid within the fruit, and $B_3$=Brix after equalization. After thawing is complete in tank 10 at start-up and the Brix calculated, the first layer of strawberries will have a Brix concentration between the initial Brix of the thawing liquid and the initial Brix of the strawberries, for example 10 Brix.

Next, the infusing liquor of 70 Brix is slowly introduced into the bottom of tank 10, and the first strata of 70 Brix infusing liquor contacts the first layer of strawberries for osmotic transfer. Using the above formula, the Brix of the first layer of berries increases to 40, and the Brix of the first strata will drop to 40. This infusion of the first layer will take a few minutes. The second strata of infusing liquor is now slowly introduced into the bottom of the tank to contact the first layer of berries, the first strata of infusing liquor being forced up into contact with the second layer of berries. The second strata also has an initial Brix of 70, so the Brix of the first layer of strawberries will be raised to 55. Meanwhile, the first strata, now at 40 Brix, will contact the second layer of berries. After infusion is complete in the second layer, the second layer will have a Brix of 25, along with the first strata. This process repeats until the first layer and then each succeeding layer of berries reach saturation. Saturation occurs when the infusing liquor which has diffused into the fruit reacts with the pectin and the acid left in the fruit to form a gel. For strawberries, saturation and gel formation occurs at approximately 50–55 Brix. Exposure to 70 Brix infusing liquor after this point involves almost no osmotic transfer at the preferred operating temperature of 13–16° C. (55–60° F.). Thus, the process is preferably conducted at a temperature not in excess of 16° C. (60° F.), so that the fruit after infusion maintains the attributes of a fresh fruit, i.e., taste and color. During the infusion process, the sugar from the infusion liquor replaces the juice in the berries in an almost one to one ratio as evidenced by the above formula. However, above 55 Brix, the juice in the fruit is increasingly tied up in a gel, so the process of osmotic transfer slows down. At saturation, where the sugars, acids, and pectin within the fruit form a gel, the fruit will not slump if removed from the liquor. Thus, after a tank of berries has been fully infused during this continuous batch process, typically the strawberries in the tank to be dumped are at about 55 Brix, while the infusing liquor is at or near 70 Brix.

Initial Processing

As set forth above it may be desirable to initially process the fruit. To this end, strawberries may be initially sliced or diced. The initial processing of strawberries where they are sliced is illustrated in FIG. 1. Thus, strawberries, which have been frozen in a conventional manner, are taken from the freezer and placed into a cold room 20 to temper to approximately −9.5° C. (15° F.). From the cold room, the still frozen strawberries proceed on a conveyor to an Urschel slicer 22, where they are sliced. (Any type of industrial slicer which will give a satisfactory product will do). After slicing, the still frozen strawberries are dropped onto the top screen 24 (FIG. 2) of a two screen vibratory separator 26. While in the separator, the strawberries are warmed to a higher temperature. To this end they are sprayed with a 65–71° C. (150–160° F.) warming liquid, (initially water, and then water mixed with strawberry juice). The seeds and other fines will be washed through the top screen 24, but not the second or bottom screen 28, and will be discharged from the bottom screen into tank 30 for subsequent disposal. The warming liquid passes through both screens 24 and 28 and is received in vessel 31. This liquid is then pumped via pump 32 into a heat exchanger 33 to raise its temperature back to 65–71° C. (150–160° F.) and is used again to spray further strawberries which have been discharged onto the screen 24.

The flow of the warming liquid is preferably controlled in such a manner that there is neither net gain or loss of liquid, and the process is continuous.

As the sliced strawberries leave the vibratory separator on conveyor belt 34, they are in a "semi-thawed" state. They are conveyed to a hopper 35 for holding until they can be transferred to a further conveyor belt 38 which carries the strawberries to the infuser tanks.

Continuous Batch Processing

The stratified column of infusing liquor passes through all of the berries in tank 10 and proceeds through tanks 12, 14, 16, and then back to tank 10 under the successive control of pumps 54, 56, 58, and 59. Each tank holds approximately 3 inches of strawberries below the screen, plus an additional reservoir of fluid above the screen. The strawberries, for example in tank 10, reach saturation after three cycles. Although strawberries reach saturation at 55 Brix, the Brix of the infusing liquor is preferably 70 Brix, since a 70 Brix solution will not spoil over an extended period of time. After infusion is completed in any tank, the strawberries are removed from the tank for further processing. After start-up, a column of substantially pure fruit juice will precede the stratified column. Part of this column of substantially pure juice is apportioned off to the juice tank 69 for further juice processing. Thus, a substantial juice byproduct is obtained by this infusion process.

During continuous operation, differing aspects of the invention are occurring simultaneously in each of the respective tanks. After start-up, during the continuous batch processing, the stratified liquor which is used to treat the fruit has a length of about 1½ tanks. For example, at the beginning of cycle n, fruit in tank 10 has become substantially fully saturated, and tank 10 is ready to be emptied. At this time the infusing liquor in tank 10, top and bottom, is at 70 Brix, and in the next 1½ tanks (12 and 14) it is stratified. Thus, the sugar concentration in the bottom of the next tank 12 is 70 Brix, and the sugar concentration at the top of tank 12 is in the range of 25–30 Brix. At this time the infusion liquor in the bottom half of tank 14 is partially stratified, the sugar concentration in the bottom being 25–30 Brix, and this stratification continues to about midway up the tank, where the Brix content drops to an amount just slightly more than that of the berries.

Cycle n commences when the introduction of infusion liquor is switched from tank 10 to tank 12. Cycle n may be as long as 12 hours or as little as 3 hours. After the commencement of the cycle, tank 10 must be dumped, and it must be refilled with fresh berries and thawing liquid, the fresh berries being secured in place with screen 40.

Initially, during a first time period of cycle n, tank 10 is isolated from the other tanks 12–16 by closing off suitable valves (not numbered). During this same time period, flow from the infusion liquor tank 50 is directed to the bottom of tank 12 by closing and opening suitable valves. In addition, the flow from tank 14 is directed to overflow tank 18 by opening a suitable valve. These valves may be manually operated, or they may be solenoid operated. At the conclusion of the first time period of cycle n, infusing liquor will be pumped into tank 12, and the front of the infusing liquor, which is pure fruit juice, will be pumped into overflow tank 18. The flow rate of pump 56 is adjusted to maintain the length of the stratified column to 1½ tanks. To this end, refractometers 60 are provided in the fluid lines which convey infusing liquor from the top of one tank to the bottom of the next tank, the refractometers measuring the Brix of the liquor as it exits a tank. If the Brix is too high, during cycle n pump 56 is slowed up. If the Brix is too low, the output of pump 56 is increased.

Once tank 10 has been isolated and flow has been established through tanks 12 to 14, during a second time period of cycle n, the berries and infusing liquor surrounding the berries in tank 10 are dumped for further processing in the manner set forth below. Subsequently, tank 10 is refilled with fresh berries and thawing liquid from tank 36. In addition, the berries are secured in place with screen 40.

During the next cycle n+1, tank 12 is isolated, the output from tank 14 is connected to tank 16. Tank 12 will now be dumped and refilled in the same manner as tank 10.

From the above discussion, the continuous operation may be generalized as follows. At any given time, during continuous operation, one tank in the process will be isolated out of the cycle for emptying and subsequent refilling. The tank immediately downstream of the isolated tank will be receiving only pure 70 Brix infusing liquor, and the fruit within it will be approaching saturation. A third tank, which is immediately downstream of the second tank, will be receiving stratified liquor pumped from the second tank. Finally, a fourth tank, which is immediately downstream of the third tank, may be isolated containing only thawing liquid and fruit, or it may be receiving stratified liquor from the third tank. Excess fluid from a downstream tank will be pumped into the holding tank 18 until it is used later on. While 70 Brix has been used in the example set forth above, the infusion liquor could be at other Brix, for example 72.

Further Processing

The berries and infusion liquor dumped from one of the processing tanks 10–16 may now be separated by use of a vibratory separator 62. The infusion liquor separated from the berries are sent back to tank 50 and is reused as pure 70

Brix infusion liquor. The berries which leave screen 62 are washed on a vibratory screen 64, and then are suitably dried by a drier 66 to a water activity level suitable for long term shelf storage life. Water activity is determined from the following formula: $A_w=P/P_o$, where P is the partial pressure of water in the product, and $P_o$ is the vapor pressure of water at the given temperature. It has been found that there is no yeast, mold, or bacteria growth when the water activity is below 0.65, and that there is very little enzyme activity when the water activity is below 0.5. Therefore, water activities in the range 0.64–0.40 are desirable for good storage life of the product. (See JOHN T. NICKERSON and ANTHONY J. SINSKEY, *Microbiology of Foods and Food Processing*, 1972, pp. 71–83, American Elsevier Publishing Company, New York.)

The drying should be done at a temperature sufficiently low so that most aromatics remain with the fruit. To this end, the berries are sent from the washer 64 to a conveyor 68 which passes through a dryer 66. The drying process occurs by passing heated air over a thin layer of berries laid on the conveyor belt. In one embodiment, a SANDVIK model 2 dryer system is used. During the drying process, the berries shrink slightly but the temperature is low enough to keep the berries' natural aromatics inside the berries. The drying process contains at least three drying stages. In the first stage, the berries are dried from a moisture content of approximately 55% to a moisture content of approximately 38% by drying for approximately 40 minutes. The air temperature for the first stage is 95–105° C. (203–221° F.). After the first stage, the berries are mixed, equilibrated, re-doubled, and sent to stage two. During stage two of the drying process, the air temperature is 80–95° C. (176–203° F.) and the moisture content is further reduced to 23% by drying for approximately 80 minutes. After the second stage, the berries are mixed, equilibrated, and sent to stage three. Stage three air temperature is 75–80° C. (167–176° F.). and the moisture content is reduced to its final value of 13% by drying in stage three for approximately 80 minutes. At this resultant moisture content, the water activity of the berries is approximately 0.45–0.49 at room temperature. This drying process produces berries that possess uniformity in size and a good appearance. After drying, the berries are lightly misted with sunflower oil to keep the berries from sticking to each other or to other products with which the berries may be mixed. These berries are the final dried product and can now be used with a stable shelf life.

Other Specific Fruit Processing

The present invention infuses many different types of fruit in addition to strawberries. In applicant's U.S. Pat. No. 6,159,527 a process for hard fruits such as cranberries is fully discussed. While specific soft fruits are discussed below, the invention is not limited to the specific fruits set forth in this application.

Blueberries can be processes in two ways. If desired the blueberries may be frozen and stemmed. Then the frozen blueberries are placed directly into a first tank of the series of four interconnected tank for plumping and then infusion. Blueberries have a natural Brix content of 12 to 15 Brix so the plumping liquid is concentrated to the natural Brix content of the blueberries, and is warmed to slightly thaw the blueberries. After the blueberries have been plumped, they are infused in the same manner as berries. The infusion liquor is formed from suitably concentrated blueberry juice, water, and sugar, and/or citric acid, the blueberry infusion liquor also being at 70 Brix. If desired, fresh blueberries may be infused. To infuse fresh blueberries, the skin of the blueberry must be pierced after the blueberries are stemmed. The blueberries are then placed directly into infusion process tank without squeezing, and are infused to saturation which is about 58 Brix. In this process, as there is no preliminary squeezing, blueberry juice is extracted from the fruit during the infusing process. Thus, after start-up, a column of substantially pure fruit juice will precede the stratified column which is common to all of the fruits mentioned below which do not require squeezing as a step in the initial processing. Part of this column of substantially pure juice is apportioned off to the juice tank 69 for further juice processing in the place of the juice which is squeezed from hard fruits like cranberries. This juice can be used to make commercial fruit juices or other products that require fresh fruit juices. The remaining portion of the fruit juice is recirculated as the plumping liquid be being pumped to the plumping tank 18 and sent through the infusion tanks. After infusion, the berries may be suitably dried to the desired water activity level, in the same manner as berries. Alternatively, the blueberries can be packages as a final product directly from the infusion tanks.

Raspberries are frozen and then placed into an infusion process tank. Raspberries have a natural Brix content ranging from 10 to 12 Brix. The thawing liquid is warmed so as to thaw the raspberries completely. The raspberries are infused to saturation, approximately 62 Brix.

Cherries are frozen and pitted and the skin is broken. The cherries are placed directly into the infusing process. Cherries have a natural Brix content of 14 so the plumping liquid starts at 14 Brix. Since the cherries are frozen when placed in the infusing process, the plumping liquid is warmed to slightly thaw the cherries. The cherries will be infused to approximately 55 Brix. Fruit juice will be produced in the same manner as blueberries, and the resulting product may also be suitably dried.

Grapes while a soft fruit are squeezed prior to infusion. This infusion process produces a raisin that is sweeter and less chewy than raisins produced in the normal manner.

Apples are processed by slicing raw (but not frozen) apples very thin. The apples are then placed in one of the infusion process tanks and infused. The apples are infused to saturation and may be suitably dried to the desired water activity level.

Peaches are processed in a manner similar to apples with a few distinctions. Raw peaches are sliced thin. Then the peach slices are infused. Peaches have a natural Brix content of 12. The peaches are infused to approximately 55 Brix.

The present invention has also been shown to work well with vegetables like broccoli, celery and carrots. The broccoli and celery are diced and then infused. The Brix content of natural celery is 7 or 8. The Brix content of natural broccoli is 5 or 6. celery is infused to approximately 30 Brix and broccoli is infused to approximately 40 Brix. Infused celery and broccoli are suitable for use in stuffing.

Infusion Liquor Makeup

The infusing liquor is initially made in mixer 70 from sugar syrup received from tank 71 and fruit juice either received from evaporator 48 where it is evaporated up to the desired starting Brix, or from evaporator bypass. When making up the liquor for some fruits, it is necessary to evaporate the fruit juice in order to have soluble acid and a concentration of pigments which equal the concentration of the soluble acid and pigments desired in the finished product. However, with other fruit, for example blueberries, as the Brix of the juice is relatively high, and because it is not necessary to concentrate for pigment and soluble acid, the juice may be received directly from the overflow tank 18 via evaporator bypass 72. To prevent gelling of the infusing liquor, the juice may be initially treated with pectinase from conditioner tank 74. Infusion liquors for other fruit may require the addition of other conditioning agents, such as citric acid for blueberries.

While a preferred form of this invention has been described above and shown in the accompanying drawings, it should be understood that applicant does not intend to be limited to the particular details described above and illustrated in the accompanying drawings, but intends to be limited only to the scope of the invention as defined by the following claims. While the invention was developed for infusing fruits, as noted above it may also be used with other vegetable products. Therefore, the term fruit as used in the following claims should be interpreted to include other vegetable products, such as celery, carrots, and/or broccoli.

What is claimed is:

1. A method for infusing fruit with sugar and for producing a fruit juice product comprising the following steps:
   (a) providing one or more tanks to provide a flow path from the bottom each tank to the top of each tank;
   (b) placing previously frozen fruit having a substantial fruit juice content into a tank to form a batch of fruit;
   (c) preparing an infusing liquor from fruit juice and a concentrated sugar solution from 50 to 70 brix for infusing the batch of fruit;
   (d) causing the infusing liquor to flow through the batch of fruit via the flow path at a rate not substantially greater than the rate of infusion of sugar from the infusion liquor into the fruit, so that (i) the liquid along the flow path includes successive strata with decreased concentration of sugar in the direction of flow, (ii) there results a change in the concentration of sugar in the infused fruit, and (iii) the liquid includes, at its most downstream portion, a high percentage of fruit juice, this step being performed at a temperature of not greater than 38° C. and at a rate sufficiently slow so as to prevent osmotic dehydration of the fruit;
   (e) continuing step (d) until the batch of fruit has a desired concentration of sugar infused therein;
   (f) extracting and collecting fruit juice from the fruit wherein the fruit juice is extracted and collected during step (d); and
   (g) collecting the infused fruit.

2. The process as set forth in claim 1, further comprising drying the infused fruit collected in step (g) to a sugar concentration falling within a range of from about 70 Brix to about 88 Brix.

3. The process as set forth in claim 2, wherein the dried infused fruit has a water activity level ranging from about 0.50 to about 0.65.

4. The process as set forth in claim 1, wherein step (d) is conducted at a temperature of not more than about 16° C. (60° F.).

5. An infused fruit made in accordance with claim 1.

* * * * *